United States Patent
Springhorn et al.

(10) Patent No.: US 8,235,255 B2
(45) Date of Patent: Aug. 7, 2012

(54) PISTONS WITH A LIP SEAL AND CARTRIDGE SYSTEMS USING SUCH PISTONS

(75) Inventors: Robert W. Springhorn, Cream Ridge, NJ (US); Craig A. Blum, Freehold, NJ (US)

(73) Assignee: Nordson Corporation, Westlake, OH (US)

( * ) Notice: Subject to any disclaimer, the term of this patent is extended or adjusted under 35 U.S.C. 154(b) by 441 days.

(21) Appl. No.: 12/486,064

(22) Filed: Jun. 17, 2009

(65) Prior Publication Data

US 2010/0001026 A1 Jan. 7, 2010

Related U.S. Application Data

(60) Provisional application No. 61/077,727, filed on Jul. 2, 2008.

(51) Int. Cl.
*G01F 11/00* (2006.01)
(52) U.S. Cl. .......................... 222/386; 222/326; 222/327
(58) Field of Classification Search .......... 222/326–327, 222/135–137, 386
See application file for complete search history.

(56) References Cited

U.S. PATENT DOCUMENTS

| | | | |
|---|---|---|---|
| 2,188,258 A | 1/1940 | Zinkil et al. | |
| 2,489,715 A | 11/1949 | Mark, Jr. et al. | |
| 3,250,443 A * | 5/1966 | Abbott, Jr. | 222/327 |
| 3,347,418 A | 10/1967 | Fefferman | |
| 3,501,063 A * | 3/1970 | Sundholm | 222/326 |
| 4,169,547 A * | 10/1979 | Newell | 222/386 |
| 4,854,485 A * | 8/1989 | Collins | 222/386 |
| 5,249,709 A | 10/1993 | Duckworth et al. | |
| 5,400,926 A | 3/1995 | Keller | |
| 5,620,423 A | 4/1997 | Eykmann et al. | |
| 6,494,348 B2 | 12/2002 | Prestele | |
| 6,848,480 B2 | 2/2005 | Brennan | |
| 7,621,428 B2 * | 11/2009 | Springhorn | 222/387 |
| 7,748,577 B2 * | 7/2010 | Brugner | 222/387 |
| 2006/0144858 A1 | 7/2006 | Brennan et al. | |
| 2007/0000951 A1 | 1/2007 | Springhom | |
| 2007/0246482 A1 | 10/2007 | Goldberg et al. | |

FOREIGN PATENT DOCUMENTS

| | | |
|---|---|---|
| NL | 8503132 A | 6/1987 |
| WO | 0109006 A1 | 2/2001 |
| WO | 2005036294 A1 | 4/2005 |

OTHER PUBLICATIONS

European Patent Office, Search Report issued in related European Application No. EP 09 16 3718 dated Nov. 4, 2009.
European Patent Office, European Search Report issued in related European Application No. EP 09 17 8000 dated Feb. 10, 2012.

* cited by examiner

*Primary Examiner* — Frederick C. Nicolas
(74) *Attorney, Agent, or Firm* — Wood, Herron & Evans, LLP

(57) ABSTRACT

Pistons for use in a dispensing cartridge, as well as cartridge systems including such pistons. The piston may include a body having a generally cylindrical configuration with a sidewall and a sealing lip extending outwardly from the sidewall. The sealing lip has a first portion dimensioned to have a first flexibility, a second portion dimensioned to have a second flexibility greater than the first flexibility, a sealing edge terminating the second portion, and a sealing bead positioned between the first portion and the sealing edge of the second portion, and the second portion configured to deflect relative to the first portion such that the sealing edge and the sealing bead have a contacting relationship with an inner wall of the cartridge when the piston is inserted into the cartridge. The sealing edge and sealing bead cooperate to prevent leakage during storage and to prevent blow-by during use.

17 Claims, 4 Drawing Sheets

PISTONS WITH A LIP SEAL AND CARTRIDGE SYSTEMS USING SUCH PISTONS

CROSS-REFERENCE TO RELATED APPLICATIONS

This application claims the benefit of U.S. Provisional Application No. 61/077,727, filed Jul. 2, 2008, the disclosure of which is hereby incorporated by reference herein in its entirety.

BACKGROUND

The invention relates generally to a lip seal for a piston. More particularly, the invention relates to a piston with a lip seal for use in a dispensing cartridge, as well as dispensing systems with cartridges using such pistons.

Fluid cartridges used in adhesive and sealant dispensing systems typically include one or more pistons that form a seal with an inner wall of an axial bore of the cartridge. After the cartridge has been initially filled with adhesive/sealant, the piston is positioned near a back wall of the cartridge. To expel the adhesive/sealant through an outlet in a front wall of the cartridge, a dispenser, such as caulking gun or the like, is coupled with the piston and used to advance the piston along the axial bore toward the outlet.

One of the challenges associated with such pistons relates to maintaining the seal with the inner wall of the cartridge. For example, many pistons include a central body and a sealing lip extending from the central body. The sealing lip is generally an outer wall sized to create an interference fit with the cartridge to form the seal. Because the sealing lip extends outwardly from the central body at an angle, the seal is primarily formed by a terminal end of the sealing lip. The terminal end includes a well-defined peripheral edge that contacts the inner wall of the cartridge.

Conventional sealing lips are prone to leakage. Prior to insertion into the cartridge, the peripheral edge of the sealing lip may be nicked or scratched during transport, handling, or the like. Additionally, the peripheral edge is often formed at a parting line of the mold pieces used to manufacture the piston and, therefore, is susceptible to "flash" (occurs when excess material penetrates the parting line and remains attached to the peripheral edge). Such manufacturing defects and damage to the peripheral edge (or the terminal end in general) may compromise the ability of the piston to maintain a seal with the inner wall of the cartridge. In particular, after the piston is assembled in the cartridge and the cartridge is filled with material and stored, the material may flow through the nicks or scratches and past the piston. Additional leakage past the piston may occur during dispensing operations as the piston moves toward the outlet and pressurizes the fluid. This undesirable leakage, which is referred to as "blow-by," may result in the material flowing onto portions of the dispenser or into other unintended areas.

Some manufacturers have attempted to increase the reliability of piston sealing lips by providing a rounded or chamfered edge at the terminal end. Although design modifications may make the edge more robust and less susceptible to damage, the modifications may have a tendency to promote blow-by during dispensing operations. This is because rounded and chamfered edges make it easier for material to flow past the sealing lip. Thus, the design modifications that make the edge more robust may also make the edge less effective at maintaining a seal during dispensing operations.

Therefore, a piston with a sealing lip design configured to reduce or minimize blow-by and other leakage is highly desirable.

SUMMARY

In one embodiment, a piston with an improved sealing lip is provided for use in a cartridge. The piston includes a body having a generally cylindrical configuration with a sidewall and a sealing lip extending outwardly from the sidewall. The sealing lip has a first portion dimensioned to have a first flexibility, a second portion dimensioned to have a second flexibility greater than the first flexibility, a sealing edge terminating the second portion, and a sealing bead positioned between the first portion and the sealing edge of the second portion, and the second portion configured to deflect relative to the first portion such that the sealing edge and the sealing bead have a contacting relationship with an inner wall of the cartridge when the piston is inserted into the cartridge.

In yet another embodiment, a cartridge system includes a cartridge configured to store a material to be dispensed and a piston inserted in the cartridge. The piston is slidably movable relative to the first cartridge. The piston includes a body having a generally cylindrical configuration with a sidewall, and a sealing lip extending outwardly from the sidewall. The sealing lip has a first portion dimensioned to have a first flexibility, a second portion dimensioned to have a second flexibility greater than the first flexibility, a sealing edge terminating the second portion, and a sealing bead positioned between the first portion and the sealing edge of the second portion. The second portion is configured to deflect relative to the first portion such that the sealing edge and the sealing bead have a contacting relationship with an inner wall of the cartridge.

The design of the sealing lip is configured such that the sealing edge reduces or minimizes blow-by during use when the piston is advanced inside the cartridge to pressurize and dispense the fluid inside the cartridge and the sealing bead reduces or minimizes leakage when the cartridge is filled and stored awaiting use.

DETAILED DESCRIPTION

Figure 1:
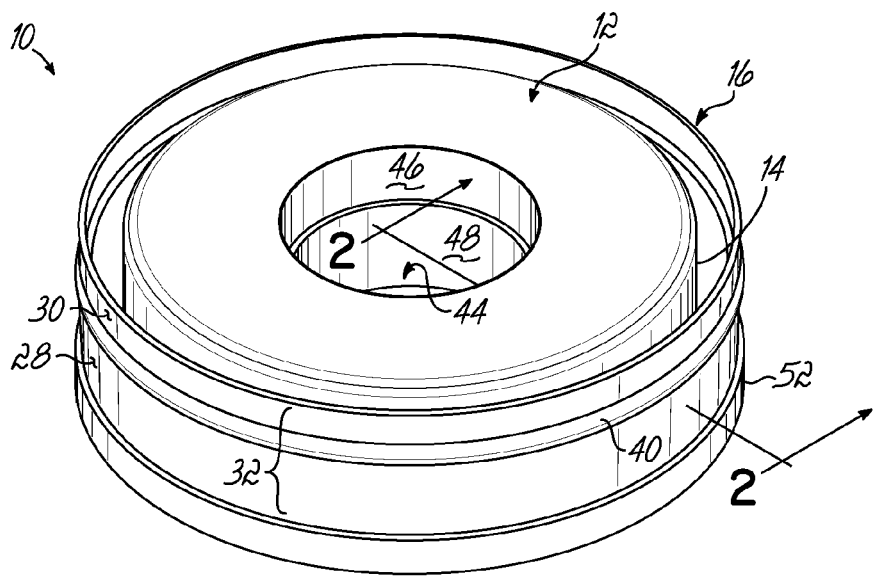
FIG. 1 is a perspective view of a piston for use in a dispensing cartridge.
Figure 2:
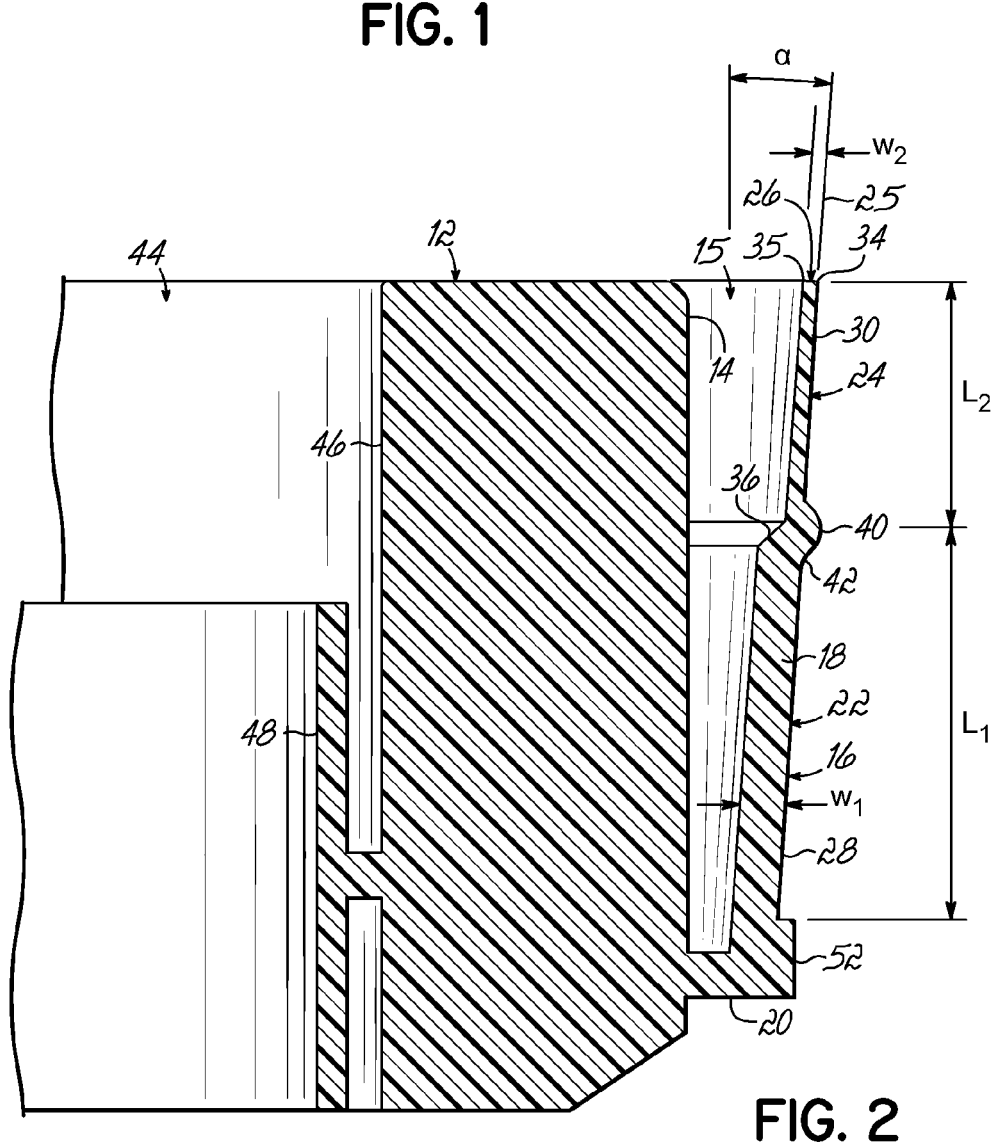
FIG. 2 is a cross-sectional view taken along line 2-2 in FIG. 1.

FIGS. 1 and 2 illustrate one embodiment of a piston 10 for use in a dispensing cartridge. As used herein, the term "cartridge" refers to any cylindrical housing, and the term "piston" refers to any component slidably received in the cartridge and forming seal with an inner wall of the cartridge. Thus, persons of ordinary skill in the art will appreciate that the piston 10 shown in FIG. 1 is merely exemplary in nature and that the structure forming the seal may be incorporated into other piston designs.

The piston 10 includes a body 12 having a generally cylindrical configuration with a sidewall 14 arranged in a generally axial direction. A sealing lip 16 extends outwardly from the sidewall 14 and also in a generally axially direction. More specifically, and with reference to FIG. 2, a flange portion 20 of the sealing lip 16 projects radially outward from the sidewall 14. First and second portions 22, 24 of the sealing lip 16 then extend axially and slightly radially outward from the flange portion 20, with the second portion 24 defining a terminal end 26 of the sealing lip 16. The first and second portions 22, 24 define a peripheral wall 18 of the piston 10 that surrounds and encircles the sidewall 14 of the body 12. A cavity 15 is defined between the sealing lip 16 and the sidewall 14.

In one embodiment, the first and second portions 22, 24 of the sealing lip 16 each have a frustoconical geometrical shape (i.e., a frustrum of a cone or truncated cone) and are generally aligned along a common axis (i.e., concentric) when in a non-deflected condition before positioning inside a cartridge and into contact with an inner wall of the cartridge. For example, FIG. 2 shows a configuration where the first and second portions 22, 24 define respective first and second sections 28, 30 of an outer surface 32 (FIG. 1) of the sealing lip 16, which are likewise frustoconical. The first and second sections 28, 30 are substantially contained within a common cone 25 of a shared included angle, α. The first portion 22 has a first wall thickness, $W_1$, and the second portion 24 has a second wall thickness, $W_2$, less than the first wall thickness, $W_1$. As a consequence of the narrowing wall thickness, a transition region 36 is located at the intersection of the first and second portions 22, 24 on a side of the sealing lip 16 that faces the sidewall 14 of the body 12.

Figure 2A:
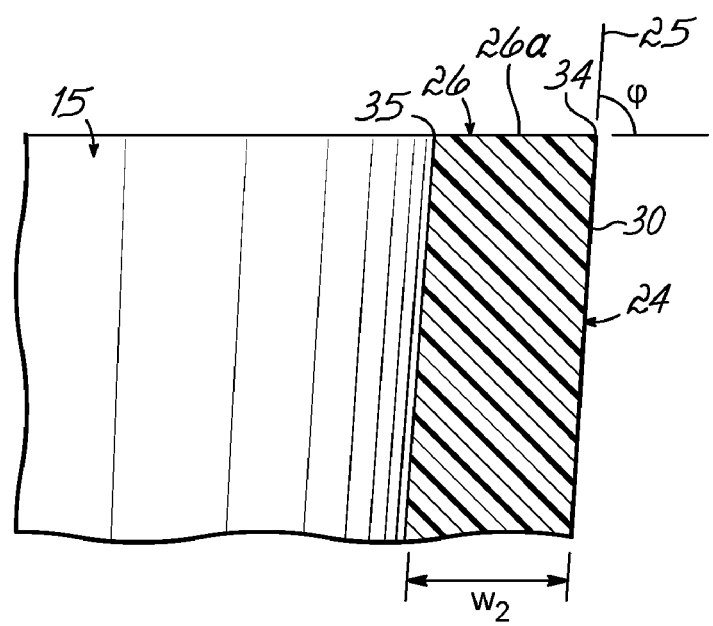
FIG. 2A is an enlarged view of a portion of FIG. 2.

As best shown in FIG. 2A, the terminal end 26 of the sealing lip 16 includes an outer edge 34 that defines a sealing edge and an inner edge 35 separated from the outer edge 34 by the second wall thickness, $W_2$, of the second portion 24. The outer edge 34 is defined at the intersection between the second section 30 of the outer surface 32 and the surface 26a of the terminal end 26. The terminal end 26 and outer edge 34 represent the leading portions of the piston 10 as the piston 10 is advanced in the cylinder or cartridge to dispense fluid and are therefore wetted by the fluid. Advantageously, the parting line of mold pieces (not shown) used to form the sealing lip 16 is located along the inner edge 35 instead of the outer edge 34. This permits the outer edge 34 to be molded without introducing flash. In addition, the outer edge 34 is non-chamfered and non-radiused, and defines an interior angle, φ, at the outer edge 24 at the intersection between the second section 30 of the outer surface 32 and the surface 26a of the terminal end 26 of 90° or less (i.e., a right angle or an acute angle). During use, the outer edge 34 is placed in a directly contacting relationship with the inner wall of the cartridge or cylinder, as described below, so that there is no gap between the terminal end 26 and the inner wall. This contrasts with common sealing lips in which the outer edge is chamfered, beveled, rounded, or radiused such that a gap is present between the portion of the terminal end of the sealing lip that contacts the inner wall. Pressurized fluid is admitted into this gap as the piston carrying the conventional sealing lip is advanced to dispense fluid from the cartridge or cylinder, which may lead to blow-by. The sharpness of the outer edge 34, which eliminates the gap, significantly reduces blow-by.

The sealing lip 16 further includes a sealing bead 40 generally positioned between the first and second portions 22, 24 at their junction and, therefore, on an opposite side of the sealing lip 16 from the transition portion 36. The sealing bead 40 is a generally round protrusion formed on the outer surface 32 (FIG. 1) of the sealing lip 16 and thus projects out of the cone containing the first and second sections 28, 30. The sealing bead 40 is opposite from the transition portion 36. A corner 42 (i.e., rounded juncture) is defined at the intersection between the sealing bead 40 and first section 28. As will be described in greater detail below, both the outer edge 34 of the terminal end 26 and the sealing bead 40 are configured to bear against the inner wall of a cartridge to form a seal.

The dimensions of the first and second portions 22, 24 of the sealing lip 16 are selected such that the second portion 24 of the sealing lip 16 has a greater flexibility (i.e., a lower stiffness or rigidity) than the first portion 22 of the sealing lip 16. The increased flexibility of the second portion 24 is achieved by reducing the wall thickness of the second portion 24 in comparison to the first portion 22. Flexibility, which is the inverse of stiffness, is a mechanical property of structures. When a force is applied to a structure like the sealing lip 16, there is a displacement in the direction of the force; flexibility is the ratio of the displacement divided by the force. In the instance of the sealing lip 16, the higher flexibility of the second portion 24 than the first portion 22 causes a greater bending or displacement of the second portion 24 than the first portion 22 when the sealing lip 16 is placed into contact with the inner wall of a cartridge. The displacement of the second portion 24 relative to the first portion 22 places the outer edge 34 and sealing bead 40 both into a contacting relationship with the inner wall of the cartridge.

In the representative embodiment, the increased flexibility of the second portion 24 in comparison with the first portion 22 is provided by selecting a second wall thickness, $W_2$, of the second portion 24 to be thinner than a first wall thickness, $W_1$, of the first portion 22. For example, the second wall thickness, $W_2$, of the second portion 24 may be less than one-half of the first wall thickness, $W_1$, of the first portion 22. Although the embodiments of the invention are not so limited, the first portion 22 also has a length, $L_1$, greater than the length, $L_2$, of the second portion 24 such that the sealing bead 40 is positioned closer to the terminal end 26 than to the flange portion 20. For example, the length, $L_1$, of the first portion 22 may be between about one-half to about three-fourths of the entire length of the sealing lip 16 (measured between the flange portion 20 and the terminal end 26), and the length, $L_2$, of the second portion 24 may be between about one-fourth to about one-half of the entire length of the sealing lip 16. In one particular embodiment, the first portion 22 is about two-thirds the length of the sealing lip 16 and the second portion 24 is about one-third the length of the sealing lip 16.

Decreasing the second wall thickness, $W_2$, of the second portion 24 (i.e., thinning the second portion 24) will increase the flexibility of the second portion 24. Increasing the length, $L_2$, of the second portion 24 will increase the flexibility of the second portion 24. Increasing the first wall thickness, $W_1$, of the first portion 22 will decrease the flexibility of the first portion 22. Decreasing the length, $L_1$, of the first portion 22 will decrease the flexibility of the first portion 22.

In one specific embodiment, the first wall thickness, $W_1$, is 0.04 inches, the second wall thickness, $W_2$, is 0.018 inches, the sealing bead 40 and corner 42 each have a radius of 0.03 inches, the length of the first portion 22 is about 0.165 inches, and the length of the second portion 24 is about 0.105 inches. In certain other embodiments, the average first wall thickness, $W_1$, of the first portion 22 of the sealing lip 16 may be less than two times greater than the second wall thickness, $W_2$, of the second portion 24 of the sealing lip 16.

With continued reference to FIGS. 1 and 2, the piston 10 may further include an annular rib 52 projecting outwardly from the outer surface 32 and a central aperture or passage 44 extending through the body 12. The passage 44 is defined by an inner wall 46 of the body 12. An inner flange 48 is attached to and concentric with a portion of the inner wall 46. Providing the piston 10 with such an arrangement enables the piston 10 to be used in the cartridge system 50 schematically shown in FIG. 3. A general overview of the cartridge system 50 shown in FIG. 3 will be provided below to facilitate discussion of the operation of the piston 10 (and particularly the sealing lip 16). Again, however, those skilled in the art will appreciate that the cartridge system 50 and piston 10 are merely exemplary in nature and that the design of the sealing lip 16 may be incorporated into pistons used with other types of cartridges.

Figure 3:
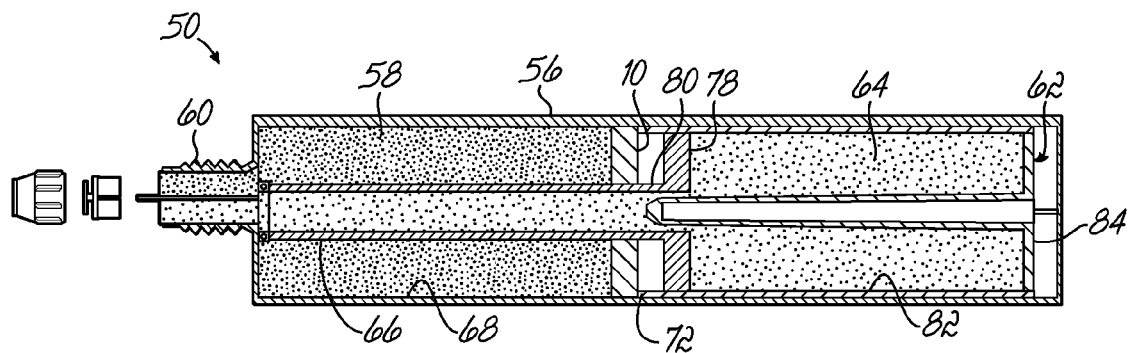
FIG. 3 is a cross-sectional view schematically illustrating one embodiment of a cartridge system incorporating the piston of FIG. 1.

The cartridge system 50 shown in FIG. 3 is similar to that disclosed in U.S. Pat. No. 7,506,783, the disclosure of which is incorporated herein by reference in its entirety. In one embodiment, the cartridge system 50 is the u-TAH™ universal cartridge available from TAH Industries, Inc., although the embodiments of the invention are not so limited. The cartridge system 50 includes an outer cartridge or cylinder 56 configured to store a first material 58 to be dispensed from an outlet or nozzle 60 and an inner cylinder 62 configured to store a second material 64 to be dispensed from the outlet 60. A tube 66 positioned within the outer cartridge 56 hydraulically couples at least a portion of the outlet 60 with the inner cartridge 62, which is slidably disposed within the outer cartridge 56. The piston 10 (shown schematically for illustration) is slidably disposed within the outer cartridge 56 as well. Indeed, the piston 10 is positioned over the tube 66 between the outlet 60 and the inner cartridge 62. The inner flange 48 (FIG. 2) forms a seal with the tube 66 and the sealing lip 16 forms a seal with an inner wall 68 of the outer cartridge 56 so that the first material 58 can be stored in the space surrounding the tube 66 between the outlet 60 and the piston 10.

More specifically, an outer diameter defined by the terminal end 26 (FIG. 2) of the sealing lip 16 is greater than an inner diameter defined by the inner wall 68 of the outer cartridge 56. The piston 10 is therefore received in the outer cartridge 56 with an interference fit. The amount of interference is sufficient to bring both the outer edge 34 of terminal end 26 and the sealing bead 40 of sealing lip 16 into contact with the inner wall 68. The second portion 24 of the sealing lip 16 can easily flex toward the body 12 to allow for such contact because of its reduced wall thickness. The outer edge 34 and a nearby portion of the second section 30 of the outer surface 32 contact the inner wall 68 of the outer cartridge 56. The sealing bead 40, which is located between rib 52 and outer edge 34, will also have a contacting relationship with the inner wall 68.

After the cartridge system 50 is filled, the piston 10 is positioned adjacent to the inner cartridge 62 with the flange portion 20 abutting a front end 72 of the inner cartridge 62. The contact between the terminal end 26 of the sealing lip 16 and the inner wall 68 of the outer cartridge 56 prevents the first material 58 from flowing past the piston 10. However, even if the terminal end 26 becomes nicked or otherwise damaged prior to assembly, the contact between the sealing bead 40 and the inner wall 68 of the outer cartridge 56 prevents leakage of the first material 58 past the piston 10. The sealing bead 40 is more robust than the terminal end 26 and is less likely to be damaged prior to assembly. Additionally, due to its position along the length of the sealing lip 16 (i.e., between the flange portion 20 and terminal end 26) and the presence of the corner 42, the sealing bead 40 can be spaced apart from the parting lines of mold pieces (not shown) used to form the piston 10. This reduces the effects of any flash that may occur when molding the piston 10. As a result of these factors, the piston 10 is able to maintain a reliable seal with the outer cartridge 56 during filling operations and prior to dispensing operations.

The cartridge system 50 further includes a stationary piston 78 located at an end 80 of the tube 66 and forming a seal with an inner wall 82 of the inner cartridge 62. The second material 64 is stored within the tube 66 and within the inner cartridge 62 between the stationary piston 78 and a back wall 84 of the inner cartridge 62. If desired, the stationary piston 78 may have a sealing lip (not shown) similar to the sealing lip 16.

When stored in a filled state, the piston 10 is static relative to the inner wall 68 and the sealing bead 40 on the sealing lip 16 provides the primary fluid seal with the inner wall 68. During use, the piston 10 is advanced relative to the inner wall 68 with the outer edge 34 representing the leading edge of the piston 10 in contact with the inner wall 68 and the sealing bead 40 rearward of the outer edge 34. In this dynamic state, the outer edge 34 of the sealing lip 16 provides the primary fluid seal and the sealing bead 40 provides a secondary fluid seal. The pressurized fluid is less likely to blow by the outer edge 34 and become trapped in the space between the outer edge 34 and sealing bead 40.

In use, the inner cartridge 62 is pushed or advanced toward the outlet 60 by a caulking gun or other dispenser (not shown). This movement reduces the space between the stationary piston 78 and back wall 84 so that the second material 64 is forced through the tube 66 and outlet 60. Because the front end 72 of the inner cartridge 62 abuts the flange portion 20 of the sealing lip 16, the piston 10 is pushed toward the outlet 60 as well. Thus, the movement of the inner cartridge 62 also reduces the space between the piston 10 and the outlet 60 so that the first material 58 is forced through the outlet 60 simultaneously with the second material 64.

Advantageously, the sealing bead 40 and outer edge 34 of the sealing lip 16 maintain contact with the inner wall 68 of the outer cartridge 56 during this dispensing operation. Specifically, the reduced wall thickness of the second portion 24 increases the flexibility of the sealing lip 16 so that the sealing bead 40 and outer edge 34 are pressed against the inner wall 68 by the pressure of the first material 58. This minimizes the amount of first material 58 that flows past the outer edge 34 at the terminal end 26 onto the wrong side of the sealing lip 16 between the outer edge 34 and the sealing bead 40. Again, if the seal formed by the terminal end 26 of the sealing lip 16 is compromised because of nicks or manufacturing defects (e.g., flash), the seal formed by the sealing bead 40 still prevents small amounts of the first material 58 from flowing past the piston 10 as the piston 10 is advanced. The design of the sealing lip 16, with its different wall thicknesses and/or lengths and the sealing bead 40, thus reduces or eliminates blow-by.

At the end of the dispensing operation, the piston 10 may be located near various vents (not shown) formed in the inner wall 68 of the outer cartridge 56. The purpose and operation of the vents is described in more detail in U.S. Pat. No. 7,506,783, which, as mentioned above, is incorporated herein by reference. Although the sealing bead 40 may come into contact with these vents, the robustness of the sealing bead 40 makes it less susceptible to deformation/damage than the well-defined peripheral edge on conventional sealing lips.

Figure 4A:
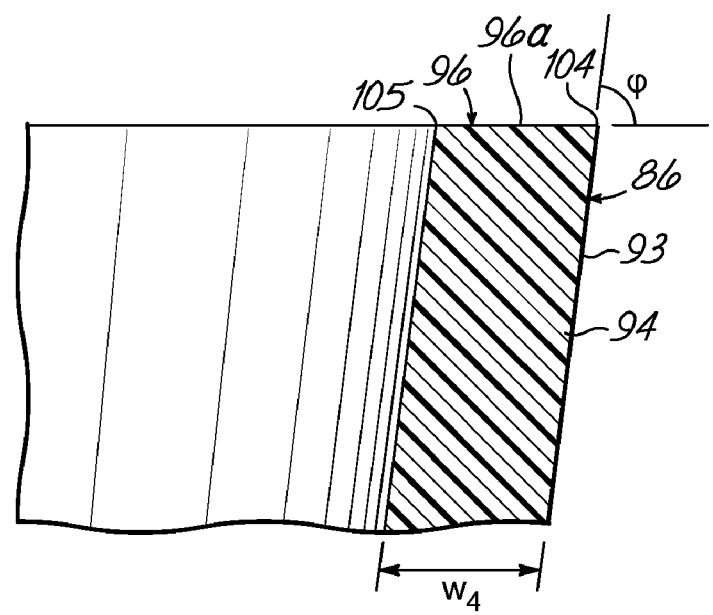
FIG. 4A is an enlarged view of a portion of FIG. 4.
Figure 5:
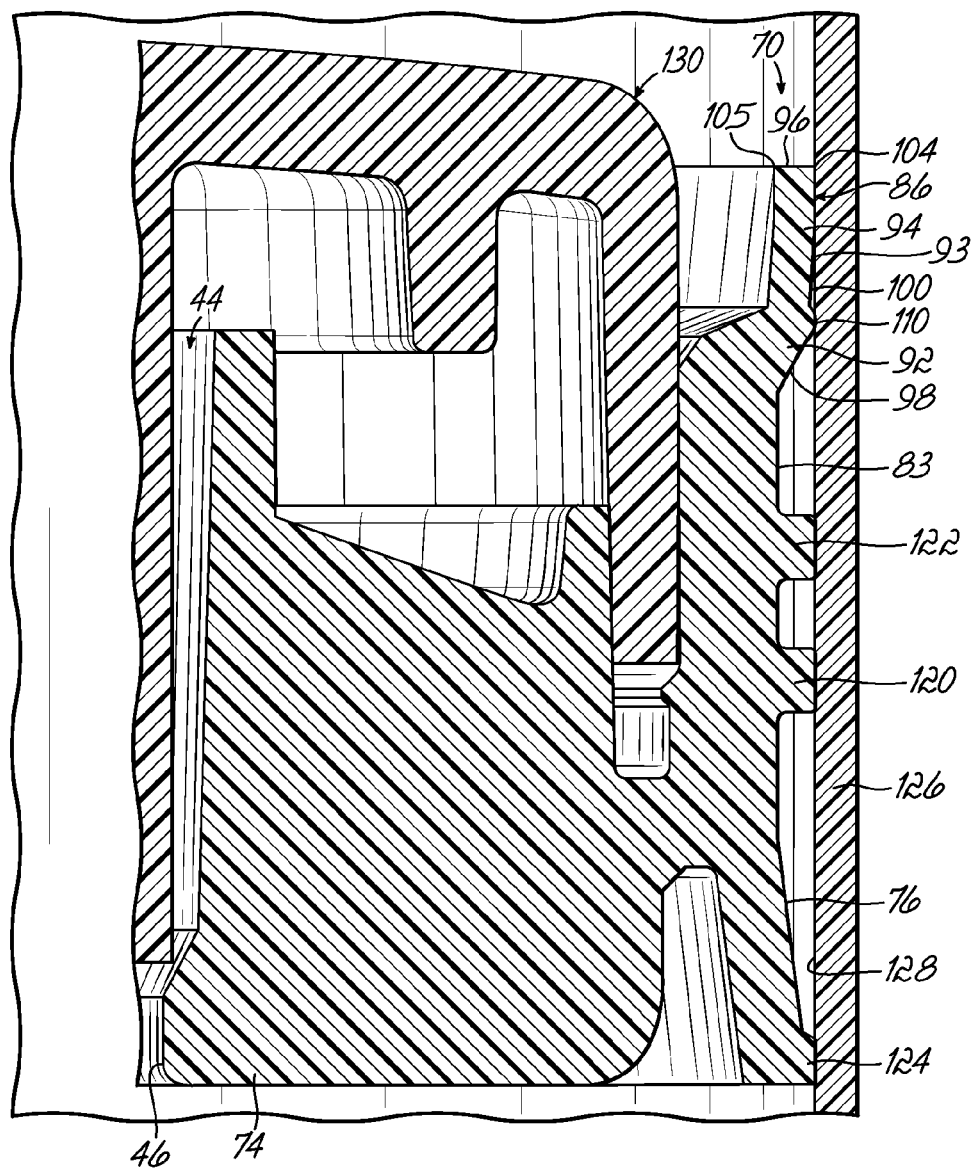
FIG. 5 is a cross-sectional view similar to FIG. 4 in which the piston of FIG. 4 is mated with a plug to form an assembly.
Figure 4:
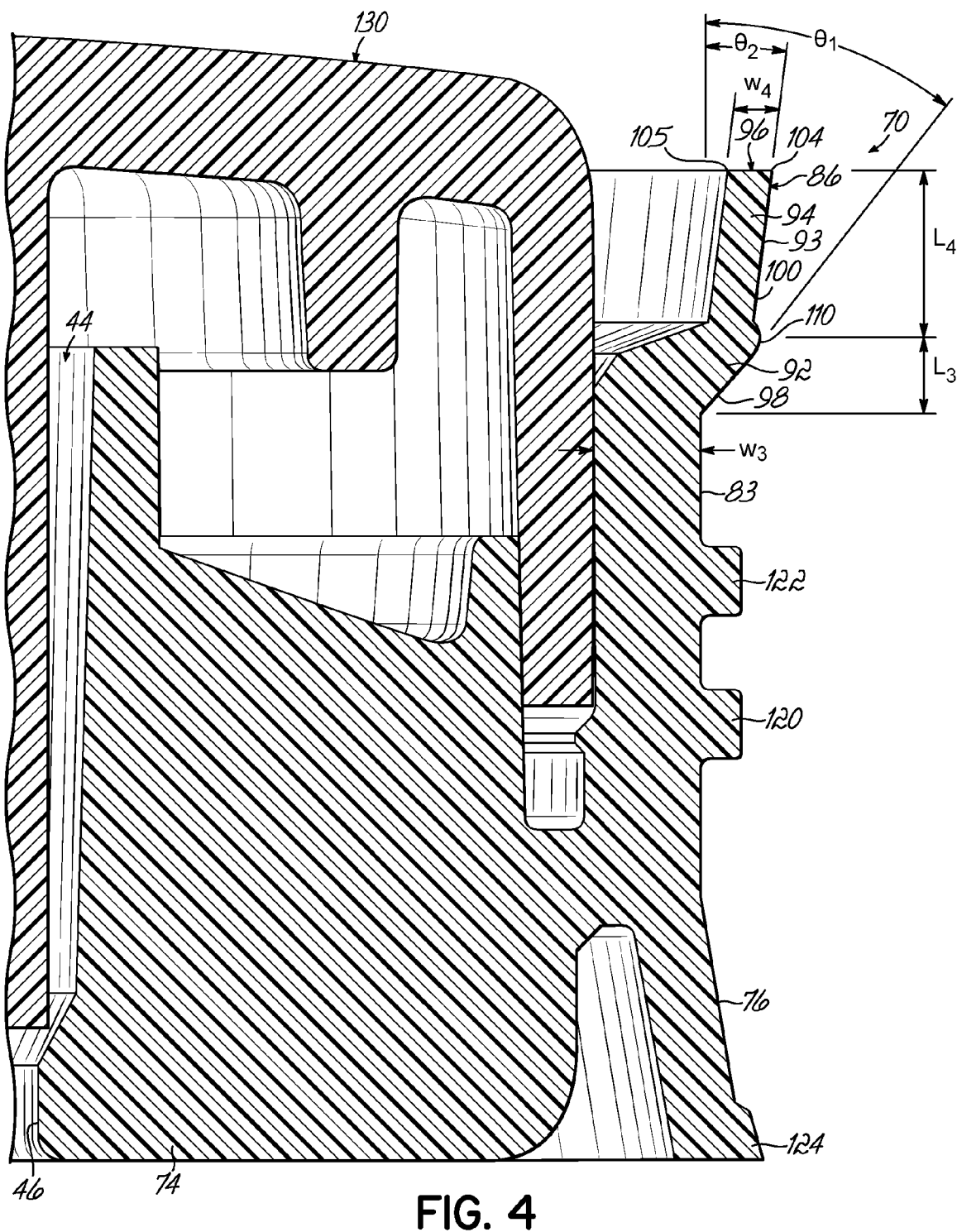
FIG. 4 is a cross-sectional view similar to FIG. 2 of a piston in accordance with an alternative embodiment of the invention.

With reference to FIGS. 4 and 5 in which like reference numerals refer to like features in FIGS. 1-3 and in accordance with an alternative embodiment of the invention, a piston 70 is designed for use with a cartridge system, such as a single-cylinder cartridge for use with a single fluid component or a dual-cylinder cartridge for use with two fluid components like the cartridge system shown in U.S. Publication Number 2007/0000951, which is hereby incorporated by reference herein in its entirety. The piston 70 includes a body 74 having a sidewall 76 with a generally cylindrical configuration and arranged in a generally axial direction. A sealing lip 86 extends outwardly from a terminus of the sidewall 76 and in a generally axially direction. First and second portions 92, 94 of the sealing lip 86 extend axially and slightly radially outward relative to the sidewall 76. A terminal end 96 of the sealing lip 86 is defined by the second portion 94 and the first portion 92 is disposed between the second portion 94 and the terminus of the sidewall 76. More specifically, the outward angling of the first portion 92 operates to space the second portion 94 slightly radially outward from the junction with the terminus of the sidewall 76.

In one embodiment, the first and second portions 92, 94 of the sealing lip 86 each have a frustoconical geometrical shape and are concentric with the first portion 92 having a greater included angle than the second portion 94. For example, FIG. 4 shows a configuration where the first and second portions 92, 94 of the sealing lip 86 define respective first and second sections 98, 100 of an outer surface 93 of the sealing lip 86, which are likewise frustoconical. The outer surface 93 of the sealing lip 86 is continuous with an exterior surface 83 of the sidewall 76. Section 98 of the outer surface 93 is inclined at an angle, $\theta_1$, relative to the exterior surface 83 of the sidewall 76. Section 100 of the outer surface 93 is inclined at an angle, $\theta_2$, relative to the exterior surface 83 of the sidewall 76. In a non-deflected condition before positioning inside a cartridge and into contact with an inner wall of the cartridge, the inclination angle, $\theta_1$, of the first section 98 of the outer surface 93 is greater than the inclination angle, $\theta_2$, of the second section 100 of the outer surface 93 so that the second section 100 is also inclined at a difference between the individual inclination angles relative to the first section 98.

As best shown in FIG. 4A, the terminal end 96 of the sealing lip 86 includes an outer edge 104, which is similar in structure and function to outer edge 34 (FIGS. 1-3) and that defines a sealing edge, and an inner edge 105. Advantageously, the parting line of mold pieces (not shown) used to form the sealing lip 86 is located along the inner edge 105 instead of the outer edge 104. Similar to sealing lip 16, this permits the outer edge 104 to be molded without introducing flash. The outer and inner edges 104, 105 are separated by the wall thickness, $W_4$, of the second portion 94 of the sealing lip 86. The outer edge 104 is non-chamfered and non-radiused. Similar to outer edge 34 (FIGS. 1-3, 2A), the interior angle, $\phi$, defined at the outer edge 24 at the intersection between the second section 100 of the outer surface 93 and a surface 96a of the terminal end 96 of 90° or less (i.e., a right angle or an acute angle). When the piston 70 is inserted into a cartridge or cylinder, the outer edge 104 has a directly contacting relationship with the inner wall of the cartridge or cylinder, as described below, so that there is no gap between the terminal end 26 and the inner wall. Similar to outer edge 34 (FIGS. 1-3), the sharpness of the outer edge 104, which eliminates the gap intrinsic to pistons with common sealing lips, significantly reduces blow-by.

The sealing lip 86 further includes a sealing bead 110, which is similar in structure and function to sealing bead 40, positioned between the first and second sections 98, 100 of the outer surface 93. The sealing bead 110 is a generally round protrusion formed on the outer surface 93 of the sealing lip 86. Similar to sealing lip 16, the outer edge 104 at the terminal end 96 and sealing bead 110 are configured to bear against the inner wall of a cartridge and cooperate to form a seal with the inner wall of the cartridge. The first portion 92 of the sealing lip 86 has a shorter length than the second portion 94 such that the sealing bead 110 is positioned closer to the terminus of the sidewall 76 than to the terminal end 96 of the sealing lip 86.

Decreasing the second wall thickness, $W_2$, of the second portion 94 (i.e., thinning the second portion 94) will increase the flexibility of the second portion 94. Increasing the length, $L_2$, of the second portion 94 will increase the flexibility of the second portion 94. Increasing the first wall thickness, $W_1$, of the first portion 92 will decrease the flexibility of the first portion 92. Decreasing the length, $L_1$, of the first portion 92 will decrease the flexibility of the first portion 92.

Similar to the flexibility relationship between the first and second portions 22, 24 of the sealing lip 16, the second portion 94 of the sealing lip 86 has a greater flexibility than the first portion 92 of the sealing lip 86. The flexibility of the first and second portions 92, 94 is adjusted by adjusting their relative wall thicknesses. The sidewall 76 has a nominal wall thickness, $W_3$. The second portion 94 of the sealing lip 86 has a wall thickness, $W_4$, and a length, $L_4$. The first portion 92 of the sealing lip 86 transitions from the thickness, $W_3$, to the thickness, $W_4$, over a length, $L_3$, such that the wall thickness, $W_4$, of the second portion of the sealing lip 86 is less than an average wall thickness of the first portion 92 of the sealing lip 86. In certain embodiments, second wall thickness, $W_4$, of the second portion 94 of the sealing lip 86 may be less than one half of the average first wall thickness of the first portion 92 of the sealing lip 86. Similar to sealing lip 16, the thinness of the second portion 94 of the sealing lip 86 relative to the first portion 92 also increases the comparative or relative flexibility of the sealing lip 86 relative to the first portion 92. In the representative embodiment, however, the length, $L_4$, of the second portion 94 is also greater than the length, $L_3$, of the first portion 92.

A pair of spaced-apart annular ribs 120, 122 and a wiper 124 project outwardly from the sidewall 76. The ribs 120, 122 are disposed between the sealing lip 86 and the wiper 124. The piston 70 is mounted with a plug 130 to form a cartridge assembly. The plug 130 has a much higher stiffness than the piston 70 and provides a rigid support for the piston 70 in the assembly. The plug 130 is generally received inside the passage 44. When the assembly is disposed inside a cartridge 126, as shown in FIG. 5, the ribs 120, 122 and wiper 124 directly contact an inner wall 128 of the cartridge 126. In addition, the sealing bead 110, the outer edge 104, and a portion of the surface 93 near the outer edge 104 have a contacting relationship with the inner wall 128. The displacement of the second portion 94 relative to the first portion 92 places the outer edge 104 and sealing bead 110 both into a contacting relationship with the inner wall 128 of the cartridge 126.

While the invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. For example, although the piston 10 and inner cartridge 62 are shown and described as separate components, the piston 10 and inner cartridge 62 may alternatively comprise united elements of a unitary structure or an integral structure. The invention in its broader aspects is not limited to the specific details, representative apparatus and methods and illustrative examples shown and described. Accordingly, departures may be made from such details without departing from the scope or spirit of the general inventive concept.

What is claimed is:

1. A piston for use in a cartridge having an inner wall, the piston comprising:
 a body having a substantially cylindrical configuration with a sidewall; and
 a sealing lip extending outwardly from the sidewall, the sealing lip having a first portion dimensioned to have a first flexibility, a second portion dimensioned to have a second flexibility greater than the first flexibility, a sealing edge terminating the second portion, the sealing edge being non-chamfered and non-radiused and defining an interior angle of 90° or less, and a sealing bead positioned between the first portion and the sealing edge of the second portion, and the second portion configured to deflect relative to the first portion such that the sealing edge and the sealing bead have a contacting relationship with the inner wall of the cartridge when the piston is inserted into the cartridge.

2. The piston of claim 1 wherein each of the first and second portions has a frustoconical geometrical shape with a common included angle before the piston is inserted into the cartridge, and the sealing bead projects out of a cone containing the first and second portions.

3. The piston of claim 1 wherein each of the first and second portions has a frustoconical geometrical shape, and a first included angle of the frustoconical geometrical shape is greater than a second included angle of the second portion before the piston is inserted into the cartridge.

4. The piston of claim 1 wherein the first portion of the sealing lip has a first wall thickness and the second portion of the sealing lip has a second wall thickness that is smaller than the first wall thickness.

5. The piston of claim 4 wherein the second wall thickness is less than one half of the first wall thickness.

6. The piston of claim 4 wherein the first portion has a length between about one-half to about three-fourths the length of the sealing lip and the second portion has a length between about one-fourth to about one-half the length of the sealing lip.

7. The piston of claim 1 further comprising:
 a plug coupled with the piston to define an assembly.

8. A cartridge system comprising:
 a first cartridge configured to store a first material to be dispensed, the first cartridge having an inner wall; and
 a first piston inserted in the first cartridge and slidably movable relative to the first cartridge, the first piston including a body having a substantially cylindrical configuration with a sidewall, and a sealing lip extending outwardly from the sidewall, the sealing lip having a first portion dimensioned to have a first flexibility, a second portion dimensioned to have a second flexibility greater than the first flexibility, a sealing edge terminating the second portion, the sealing edge being non-chamfered and non-radiused and defining an interior angle of 90° or less, and a sealing bead positioned between the first portion and the sealing edge of the second portion, and the second portion configured to deflect relative to the first portion such that the sealing edge and the sealing bead have a contacting relationship with the inner wall of the first cartridge.

9. The cartridge system of claim 8 wherein the first cartridge includes an outlet, and further comprising:
 a second cartridge slidably disposed within the first cartridge and configured to contain a second material; and
 a tube positioned within the outer cartridge and hydraulically coupling the second cartridge to at least a portion of the outlet.

10. The cartridge system of claim 9 wherein the body of the piston includes a flange defining an aperture dimensioned to accommodate the tube.

11. The cartridge system of claim 9 further comprising:
 a second piston coupled to an end of the tube and having a stationary relationship with the first and second cartridges, the stationary piston being positioned in and forming a seal with the second cartridge.

12. The cartridge system of claim 8 wherein each of the first and second portions has a frustoconical geometrical shape with a common included angle before the first piston is inserted into the cartridge, and the sealing bead projects out of a cone containing the first and second portions.

13. The cartridge system of claim 8 wherein each of the first and second portions has a frustoconical geometrical shape, and a first included angle of the frustoconical geometrical shape is greater than a second included angle of the second portion before the first piston is inserted into the cartridge.

14. The cartridge system of claim 8 wherein the first portion of the sealing lip has a first wall thickness and the second portion of the sealing lip has a second wall thickness that is smaller than the first wall thickness.

15. The cartridge system of claim 14 wherein the second wall thickness is less than one half of the first wall thickness.

16. The cartridge system of claim 15 wherein the first portion has a length between about one-half to about three-fourths the length of the sealing lip and the second portion has a length between about one-fourth to about one-half the length of the sealing lip.

17. The cartridge system of claim 8 further comprising:
 a plug coupled with the piston to define an assembly.

\* \* \* \* \*